United States Patent
Nishimura

(10) Patent No.: US 10,433,660 B2
(45) Date of Patent: Oct. 8, 2019

(54) DISPLAY TOOL AND FIXTURE

(71) Applicant: Little Studio Corporation, Shimonoseki-shi, Yamaguchi (JP)

(72) Inventor: Hitoshi Nishimura, Shimonoseki (JP)

(73) Assignee: Little Studio Corporation, Shimonoseki-shi, Yamaguchi (JP)

( * ) Notice: Subject to any disclaimer, the term of this patent is extended or adjusted under 35 U.S.C. 154(b) by 0 days.

(21) Appl. No.: 15/168,244

(22) Filed: May 31, 2016

(65) Prior Publication Data

US 2016/0270560 A1   Sep. 22, 2016

Related U.S. Application Data

(63) Continuation of application No. PCT/JP2013/082339, filed on Dec. 2, 2013.

(51) Int. Cl.
| | |
|---|---|
| A47F 5/00 | (2006.01) |
| A47F 5/08 | (2006.01) |
| F16B 1/00 | (2006.01) |
| F16B 2/06 | (2006.01) |
| F16M 13/02 | (2006.01) |

(52) U.S. Cl.
CPC .............. *A47F 5/0807* (2013.01); *A47F 5/00* (2013.01); *A47F 5/0838* (2013.01); *F16B 1/00* (2013.01); *F16B 2/06* (2013.01); *F16M 13/02* (2013.01); *A47F 5/0846* (2013.01); *F16B 2001/0035* (2013.01)

(58) Field of Classification Search
CPC ........ A47F 5/00; A47F 5/0838; A47F 5/0807; A47F 5/0846; F16B 2/06

USPC ........ 248/214, 229.16, 229.26, 227.4, 228.7, 248/230.7, 231.81
See application file for complete search history.

(56) References Cited

U.S. PATENT DOCUMENTS

| | | | | |
|---|---|---|---|---|
| 2,089,452 | A | * | 8/1937 | Utley ............... A01K 97/10 248/214 |
| 3,233,297 | A | * | 2/1966 | Havener .......... E04B 9/205 248/125.1 |

(Continued)

FOREIGN PATENT DOCUMENTS

| | | | | |
|---|---|---|---|---|
| DE | 3636464 A1 | * | 4/1988 | ........... A47F 5/0838 |
| EP | 0846433 A2 | * | 6/1998 | ........... A47F 5/0807 |

(Continued)

OTHER PUBLICATIONS

International Search Report for PCT/JP2013/082339 dated May 27, 2014.

(Continued)

*Primary Examiner* — Eret C McNichols
(74) *Attorney, Agent, or Firm* — Yokoi & Co., U.S.A.; Toshiyuki Yokoi

(57) ABSTRACT

To provide a display tool and fixture having above-average strength. A fixture (10) having: a member (12) to be fixed; a support member (14) mounted to the member (12) to be fixed; and a holding member (16) which extends in a direction intersecting with the member (12) to be fixed, which is positioned so that one end thereof is supported by the support member (14) and so as to make contact with the undersurface of the member (12) to be fixed or so as to be below the member (12) to be fixed, and from which an article is hung and held.

13 Claims, 4 Drawing Sheets

(56) References Cited

U.S. PATENT DOCUMENTS

| | | | | |
|---|---|---|---|---|
| 3,562,873 | A * | 2/1971 | Cumber | F16B 2/246 403/397 |
| 3,667,712 | A * | 6/1972 | Furgueson | A47F 5/0006 248/214 |
| 3,911,638 | A * | 10/1975 | Englund | E04B 9/10 52/506.08 |
| 3,995,823 | A * | 12/1976 | Hensel | E04B 9/18 248/327 |
| 4,309,120 | A * | 1/1982 | Werthmann | F16B 2/246 16/DIG. 25 |
| 5,035,384 | A * | 7/1991 | Werthmann | E01C 19/008 24/339 |
| 5,391,084 | A * | 2/1995 | Kreitzman | H01R 4/646 24/339 |
| 5,441,161 | A | 8/1995 | Merl | |
| 5,482,240 | A * | 1/1996 | Caraher | E04B 9/205 248/297.51 |
| 6,467,743 | B1 * | 10/2002 | Shiojima | A47F 5/0838 211/94.01 |
| 7,086,521 | B1 * | 8/2006 | Pearce | B65G 21/2072 198/436 |
| 7,178,776 | B2 * | 2/2007 | Buck | F16L 3/1008 174/541 |
| 7,988,342 | B2 * | 8/2011 | Pahl | F21V 21/112 24/457 |
| 8,157,235 | B2 * | 4/2012 | Quertelet | H02G 3/32 211/26 |
| 2010/0126951 | A1 * | 5/2010 | Winn | H02G 3/0443 211/133.5 |
| 2015/0053728 | A1 * | 2/2015 | Womble | A47G 25/28 223/85 |

FOREIGN PATENT DOCUMENTS

| | | | | |
|---|---|---|---|---|
| FR | 2399823 | A1 * | 3/1979 | A47F 5/0838 |
| FR | 2870901 | A1 * | 12/2005 | A47F 5/0807 |
| GB | 1388841 | A * | 3/1975 | F16B 1/04 |
| JP | S39-020348 | U | 7/1964 | |
| JP | S58-131765 | U | 9/1983 | |
| JP | S61-018059 | U | 2/1986 | |
| JP | H11-076011 | A | 3/1999 | |
| JP | 2000-210166 | A | 8/2000 | |

OTHER PUBLICATIONS

PCT written opinion dated May 27, 2014.
The extended European search report dated Mar. 23, 2017.

* cited by examiner

DISPLAY TOOL AND FIXTURE

CROSS-REFERENCES TO RELATED APPLICATIONS

This Application claims the benefit of priority and is a Continuation application of the prior International Patent Application No. PCT/JP2013/082339, with an international filing date of Dec. 2, 2013, which designated the United States, the entire disclosures of all applications are expressly incorporated by reference in their entirety herein.

BACKGROUND OF THE INVENTION

1. Field of the Invention

The present invention relates to a display tool and fixture.

2. Description of Related Art

Patent Article 1 describes a merchandise display tool. This merchandise display tool has an engaging member that is detachable from a bar member of a merchandise display shelf and a merchandise display bar whose rear end is detachably connected with the engaging member. The engaging member of the display tool is made of resin and the merchandise display bar is made of metal.

Patent Article 1: Official Gazette for Unexamined Japanese Patent Application No. 1999(H11)-076011.

BRIEF SUMMARY OF THE INVENTION

As shown in FIG. 7, in a fixture 1 of the prior art, a retaining member 6 used for hanging to hold commercial goods is welded to a support member 4 at a welding component 8. In order to reinforce the structural weakness, each member including the support member 4 is made to be thicker and longer (in the longitudinal direction of the frame) or needs a reinforcing member. The present invention has a purpose of providing a display tool and fixture that are stronger than the prior art.

A fixture of a first invention for achieving the aforementioned purpose of the present invention is composed of a member to be fixed, a support member attached to the member to be fixed, and a retaining member extending in a nearly horizontal direction to intersect with a direction along which the member to be fixed extends so that one end thereof is supported by the support member while being positioned at the lower side of the member to be fixed to hang and hold commercial goods in position.

In the fixture of the first invention, the support member is composed of a first support component that supports the retaining member at a first position, a second support component that supports the retaining member at a second position, and a coupling component that connects the first support component and the second support component.

In the fixture of the first invention, the coupling component is mounted on the member to be fixed.

In the fixture of the first invention, there are a first and a second hole formed in the first and the second support members for passing through the retaining member, respectively.

In the fixture of the first invention, the first support component or the second support component, or the first support component and the second support component have means for fixing the retaining member in position.

In the fixture of the first invention, the second support component has a positioning component that determines the position of the retaining member in the longitudinal direction.

In the fixture of the first invention, the base end of the retaining member is tapered or chamfered.

In the fixture of the first invention, the retaining member is detachably attached to the support member.

In the fixture of the first invention, the tip of the retaining member preferably has a means for preventing commercial goods from being dropped.

In the fixture of the first invention, the retaining member is preferably straight, and the means for preventing commercial goods from being dropped is preferably a groove formed along the entire circumference of the tip of the retaining member, or the retaining member has a diameter larger than that of the retaining member.

In the fixture of the first invention, the fixing means has preferably the direction of extending the center axis of the first hole which is not aligned with the direction of extending the center axis of the second hole.

In the fixture of the first invention, the means for positioning the retaining member in the longitudinal direction may be a cuff formed on the second support component.

The display tool of the second invention for achieving the aforementioned purpose is composed of a support member attached to a member to be fixed, and a retaining member which extends in a direction intersecting with a direction along which the member to be fixed extends so that one end thereof is supported by the support member while being positioned at the lower side of the member to be fixed to hang and hold commercial goods in position.

The present invention may improve the structural strength of the fixture compared with the prior art.

DETAILED DESCRIPTION OF THE INVENTION

Referring to figures attached herein, embodiments of the present invention are described for understanding the present invention in detail. In each figure, the parts irrelevant to the description may be omitted.

First Embodiment

The fixture of the first embodiment of the present invention may be installed in a convenience store for hanging to display commercial goods.

Figure 1:
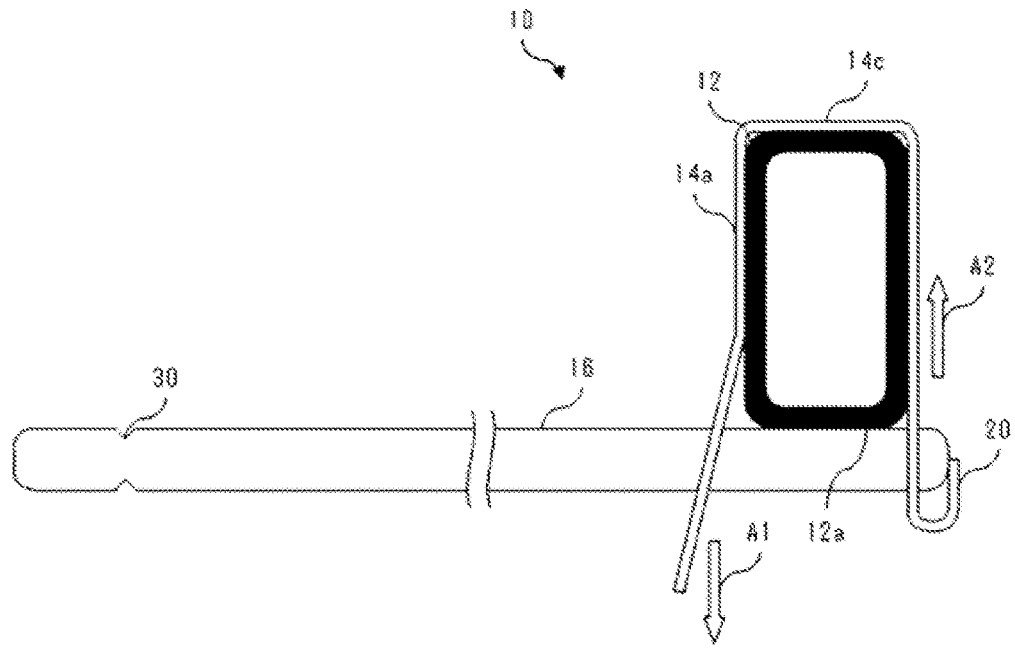
FIG. 1 is a right side views of a frame, a support member, and a retaining member of the fixture of a first embodiment of the present invention.

As shown in FIG. 1, the fixture 10 has a frame (part of a fixture member to be fixed) 12, a support member 14, and a retaining member 16. The support member 14 and the retaining member 16 constitute an example of a display tool.

The frame 12, for example, has a rectangular cross section, and extends in an essentially horizontal direction. Here, the "horizontal direction" does not mean exactly the level line. In other words, the "horizontal direction" means an "essentially level line" within a tolerance allowed by design and production (and the same hereinafter). For instance, the direction in which the frame 12 extends may be slanted within the range of −10 degrees to +10 degrees from the level line. The frame 12 is, for example, a cross bar (a bar member). The material of the frame 12 may be metal, resin, and paper such as cardboard, and the like. Another example of the fixing member to be fixed is a lattice structured member and a board like member.

The support member 14 is attached to the frame 12 to support the retaining member 16. Namely, the support member 14 may couple the frame 12 with the retaining member 16. As shown FIGS. 2A and 2B, the support member 14 has the first support component 14a and the second support component 14b and the coupling component 14c.

The support component 14a is located in front of the frame 12 (which is the side of displaying commercial goods), extending vertically. As shown in FIG. 2B, at the midpoint of the frame 12 in the vertical direction, there is a cuff part 22 whose lower part is bent to the front side. In the cuff part 22, there is a hole H1 through which the retaining member 16 passes. In other words, the first support component 14a may support the retaining member 16 at the first position.

The support component 14b is located at the back of the frame 12 (which is the opposite side of displaying merchandise), extending vertically. In the second support component 14b, there is a second hole H2, which is essentially the same size as the first hole H1, through which the retaining member 16 passes. In other words, the second support component 14b may support the retaining member 16 at the second position which is behind the first position of the retaining member 16. At the lower end of the second support component 14b, a cuff part 20 is formed folding its tip upward. The retaining member 16 contacts with the cuff part 20 so that the position of the retaining member 16 in the longitudinal direction may be determined when the retaining member 16 is attached to the support member 14.

Because of the cuff part 22 formed in the first support component 14a, the direction of extending the center axis AX1 of the first hole H1 formed in the first support component 14a and the direction of extending the center axis AX2 of the second hole H2 formed in the second support component 14b are different. In other words, viewing from the side, the center axis AX1 of the first hole H1 intersects with the center axis AX2 of the second hole H2.

The coupling component 14c is connected to the upper end of the first support component 14a and to the upper end of the second support component 14b to couple the first support component 14a with the second support component 14b. The coupling component 14c is mounted on the upper surface of the frame 12 (refer to FIG. 1).

The material of the support member 14 is for example metal and plastics. However, if the support member 14 attains pre-determined strength, its material is not particularly limited, and rubber, wood, cloth, and paper such as cardboard and the like may be used as well.

The retaining member 16 is, for example, a rod like member whose cross section is a circle or an ellipse. The retaining member 16 extends to the direction with which the frame 12 intersects. The retaining member 16 may hang commercial goods by inserting its one end into a hole of a package of the commercial goods.

As described above, the base end of the retaining member 16 is attached to the support member 14, passing through the first hole H1 formed in the first support component 14a and the second hole H2 formed on the second support component 14b, and contacting with the lower surface of the frame 12.

In order to attach the retaining member 16 to the support member 14, appropriate force is applied to the cuff part 22 (refer to FIGS. 2A and 2B) under the first support component 14a of the support member 14 to push the part backward so that the support member 14 is bent to align the center axes of the first hole H1 and the second hole H2 so that the retaining member 16 may be inserted into the aligned holes. If the backward-pushing force from the cuff part 22 under the support component 14a of the support member 14 is released, the support member 14 restores its straight shape, which exerts force on the retaining member 16 in the radial direction, holding it to the support member 14 in position.

In order to detach the retaining member 16 from the support member 14, appropriate force is applied to the cuff part 22 (refer to FIGS. 2A and 2B) under the first support component 14a of the support member 14 to push it backward so that the support member 14 is bent to align the center axes of the first hole H1 and the second hole H2 so that the retaining member 16 may be pulled out from the aligned holes. In this way, the retaining member 16 is detachable whereby a retaining member of appropriate length may be used for various applications.

Figure 3:
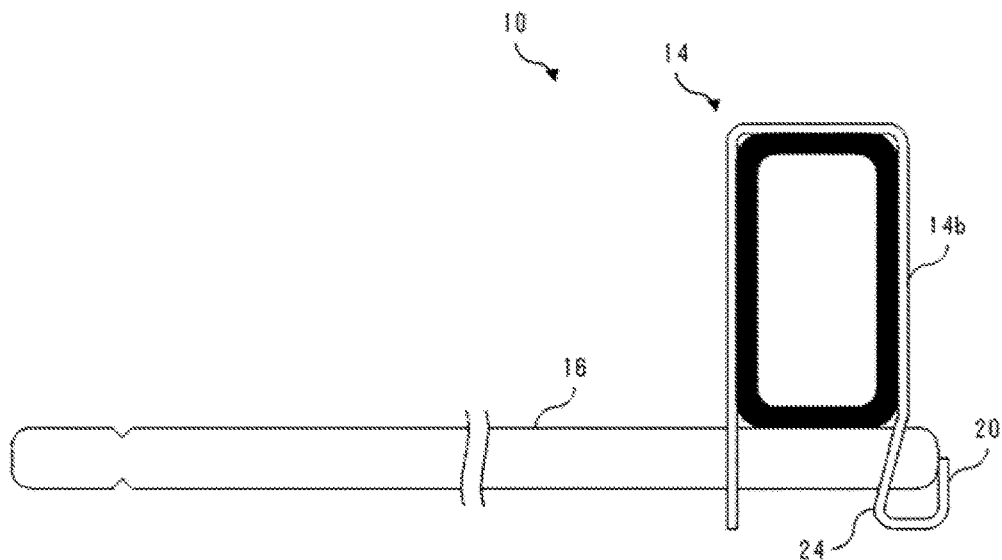
FIG. 3 is a right side of a modified example of the fixture of the present invention.
Figure 4A:
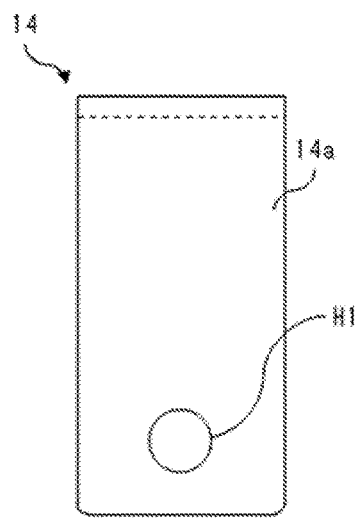
FIGS. 4A and 4B are a front view and a right side view of a modified example of the support member of the fixture of the present invention.
Figure 4B:
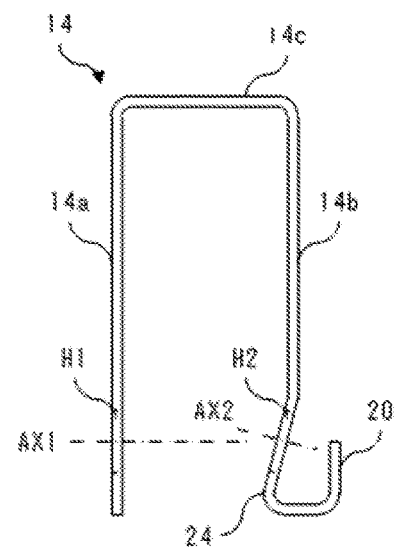

Under the first support component 14a, there was the cuff part 22 which is bent toward the front side for opening itself. Instead of the cuff part 22, the other cuff part 24 which is bent toward the front side for opening itself may be also formed under the second support component 14b as shown in FIG. 3, and FIGS. 4A and 4B. For example, if commercial goods are not filled from the backside of the retaining member 16, the parts under the first support component 14a and the second support component 14b may be bent together.

Furthermore, the parts under the first support component 14a and the second support component 14b may not be bent either but the center axis AX1 of the first hole H1 and the center axis AX2 of the second hole H2 may be misaligned. In other words, the direction of the center axis AX1 of the first hole H1 and the direction of the center axis AX2 of the second hole H2 may be different.

The degree of misalignment between the center axis AX1 of the first hole H1 and the center axis AX2 of the second hole H2 or easiness of bending the support member 14 determines the force that is applied to fix the retaining member 16 to the support member 14 in position. By enlarging the degree of misalignment, it is possible to design the fixture of the present invention un-detachably without tools.

The tip of the retaining member 16 is preferably tapered where the diameter decreases gradually toward the tip end. By tapering the tip, it is easier to insert the retaining member 16 into the first hole H1 and the second hole H2. Instead of tapering, it is also possible to chamfer the edge for this purpose.

As shown in FIG. 1, at the tip of the retaining member 16, there is a groove 30 formed on the entire circumference. Forming the groove 30 may prevent commercial goods from being dropped. In addition, since the groove 30 is formed along the entire circumference, the retaining member 16 may be installed without concern about the rotational direction of the center axis of the retaining member 16.

Instead of forming the groove 30 at the tip of the retaining member 16, a cap (not shown in the figure) may be attached to the tip. Making the outer diameter of the cap larger than that of the retaining member 16 may also prevent commercial goods from being dropped. The cross-sectional shape of the retaining member 16 may be arbitrary.

Next, the operation of the fixture 10 is described hereinafter. In the fixture of the prior art shown in FIG. 7, the first most possible location that would be broken due to excessive weights of hanging commercial goods and the retaining member is the welded part 5 that welded the support member 3 to the retaining member 2, and second most possible part is the peripheral area of the upper front surface 6 of the support member 3.

The reason why the welded part 8 welding the support member 4 to the retaining member 6 is the most possibly breakable part is the lever action to the welded part 8; for example, if the width of the upper surface of the support member 4 is 20 mm and the length of the retaining member 6 is 220 mm, then the magnitude of force acting on the welded part 8 will be approximately 5 to 10 times the total weight of hanging commercial goods and the retaining member 6.

The reason why the part around the upper front surface 4a of the support member 4 is the second most breakable part is that the support member 6 of the prior art has a structure which receives the aforementioned force in the bending direction for the part of the upper surface 4a of the support member 4 with certain thickness and width.

As for the operation of the display tool 10 of the embodiment, it may significantly reduce the thickness and width of the support member 14 compared with the prior art because no welding is required for manufacturing the member and the rear part of the lower surface 12a of the frame 12 (referring to FIG. 1) receives the total weight of hanging commercial goods and the retaining member 16a. Because the rear part of the lower surface 12a of the frame 12 receives the most weight of hanging commercial goods and the retaining member 16, it is possible to install a retaining member 16 with a diameter larger than the prior art.

The total weight of hanging commercial goods and the retaining member 16 is also supported by the lower rim of the first hole H1 and the upper rim of the second hole H2. As a result, the total weight of commercial goods and the retaining member acts as the stretching force in the direction perpendicular to the thickness direction of the first support component 14a and the thickness direction of the second support component 14b respectively (refer to the arrow A1 shown in FIG. 1) and as the compression force (refer to the arrow A2 shown in FIG. 1), and hence the support member is stronger than the prior art.

The retaining member 16 does not necessarily contact with the lower surface of the member 12 to be fixed.

Next, the manufacturing method of the fixture is described. In particular, the manufacturing process of a metal support member 14 is described. The support member 14 is manufactured by bending a rectangular plate material. A detailed description of the manufacturing step is given hereinafter.

(First Step)

The first step is to cut a metal plate of an appropriate length.

(Second Step)

Figure 2A:
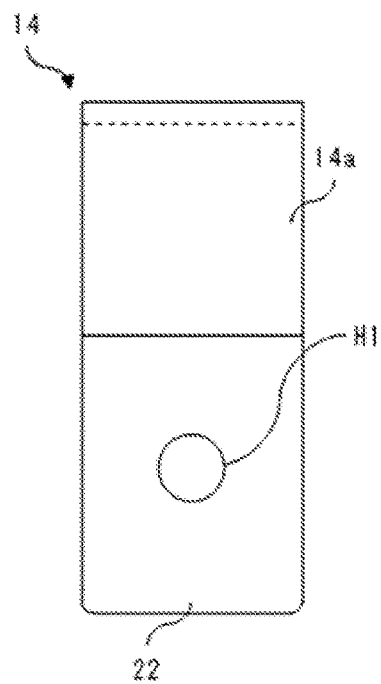
FIGS. 2A and 2B are a right side view and the front view of the support member of the fixture of the present invention.
Figure 2B:
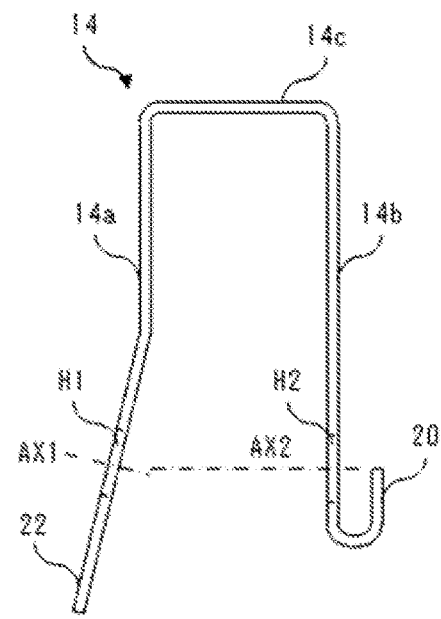

The second step is to form the first hole H1 and the second hole H2 at the predetermined positions of the first support component 14a and the second support component 14b as shown in FIG. 2A and FIG. 2B, respectively.

(Third Step)

The third step is to bend the plate material at two different mid positions in the longitudinal direction of the plate material to form the first support component 14a, the second support component 14b, and the coupling component 14c.

(Fourth Step)

The fourth step is to form a cuff part 20 by folding the tip of the second support component 14b at two different positions. The folding positions are not limited to two. For forming the cuff parts, folding is carried out at least one or more different positions at the tip of the second support component 14 and formed cuffs that determine the position of the retaining member 16 in the longitudinal direction. Furthermore, if the position of the retaining member 16 in the long direction may be determined, the cuff parts are not necessarily formed by folding.

(Fifth Step)

A cuff part 22 is formed by bending the mid position of the first support component 14a so that the tip of the first support component 14a is opened outward. With this step, the center axis AX1 of the first hole H1 and the center axis AX2 of the second hole H2 become unaligned.

As described above, the support member 14 may be easily manufactured by applying the bending and the drilling steps on the plate material. The aforementioned second and fifth steps may be interchanged if possible, and the forth and the fifth steps may be carried out as required and not always carried out.

Figure 7:
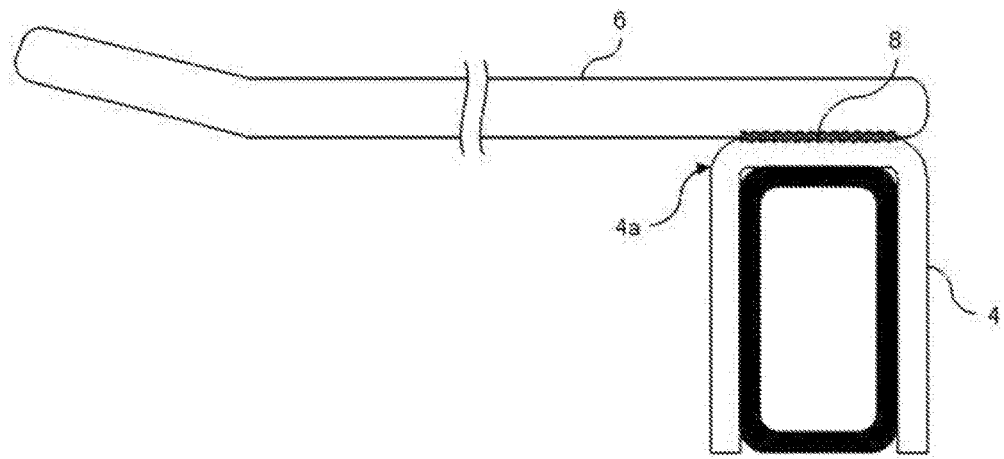
FIG. 7 is a right side view of a frame, a support member, and a retaining member of the fixture of the prior art.

As explained above, the fixture 10 may maintain a stronger structure that the prior art. As shown in FIG. 7, in a fixture of the prior art, because the base end of the retaining member 16 is welded, it is impossible to add commercial goods from behind, whereby the idea of first in, first out, i.e., selling goods in stock first is not implemented. However, the fixture 10 of the embodiment of the present invention may implement the first in, first out by adding goods to the retaining member 16 from behind because the retaining member 16 is detachable.

For adding commercial goods to a retaining member 6 of the prior art where a support member 4 and a retaining member 6 are welded together, there should be some room between a hole of a commercial goods package for hanging it and its content. In other words, a package is made to be somewhat longer for this purpose. By making the package longer, a shop clerk may hold the upper parts of the packages and add them all to the retaining member. However, due to the package thickness and other reasons, commercial goods that cannot be hung are placed on a shelf and the like.

The fixture 10 of the embodiment of the present invention does not require the aforementioned package modification but may hang thick commercial goods to implement the first in, first out sales easily.

Furthermore, the fixture 10 has another advantage in facing up commercial goods and pushing them forward.

On a shelf of displaying commercial goods, a periodic facing up is required to line them up otherwise the shelf display becomes noticeably disorganized. The fixture 10 may line up commercial goods to be less disorganized than a conventional shelf and hence an organized display may be maintained.

The fixture 10 basically does not require pushing the displayed commercial goods forward. A shop clerk may add commercial goods by lowering the tip of the retaining member 16 which is detached from the support member 14, and then attach it to the support member 14 to push the commercial goods forward.

Second Embodiment

A fixture 50 as a second embodiment of the present invention is described hereinafter. The configurational elements which are the same as those in the fixture of the first embodiment have the identical reference numerals and are omitted from the description.

Figure 5:
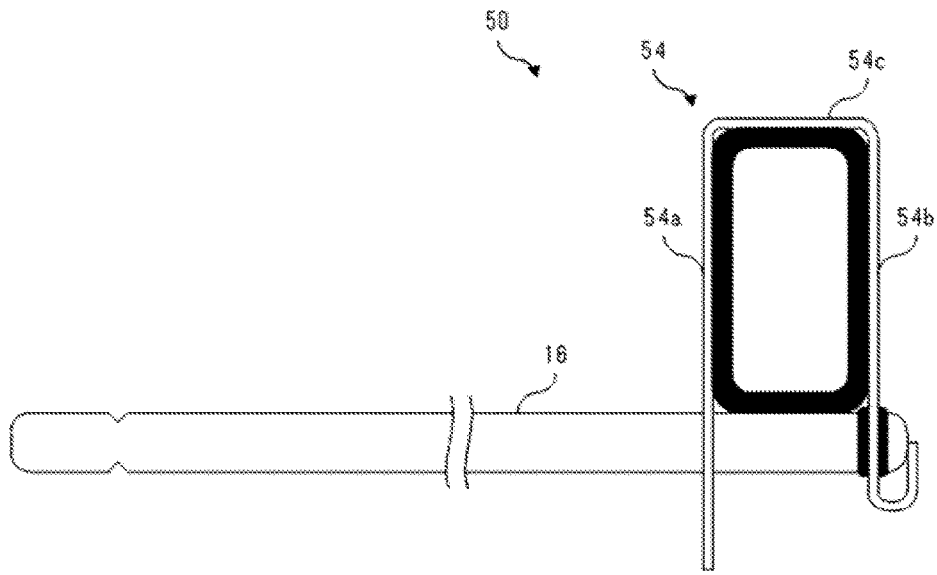
FIG. 5 is a right side views of a frame, a support member, and a retaining member of the fixture of a second embodiment of the present invention.
Figure 6A:
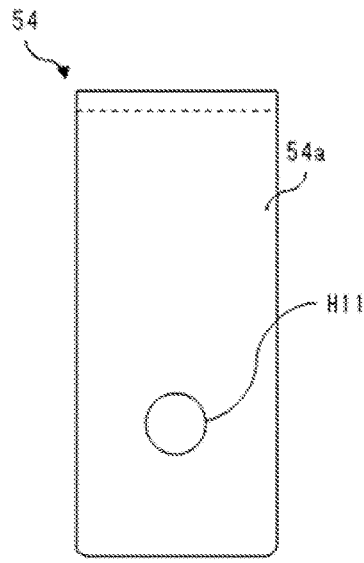
FIGS. 6A and 6B are a right side view and the front view of the support member of the fixture of a second embodiment of the present invention.
Figure 6B:
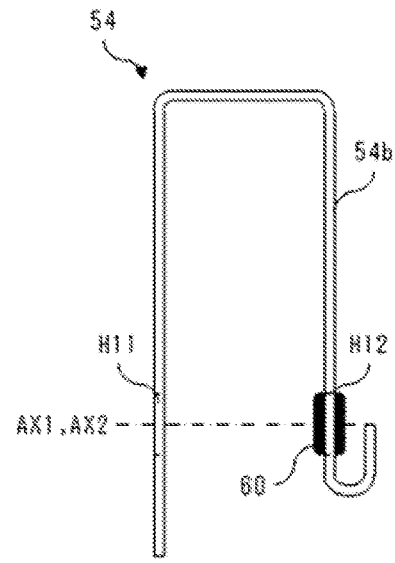

As shown in FIG. 5 and FIGS. 6A and 6B, the directions of the center axis AX11 of the first hole H11 formed in a first support component 54a and the center axis AX12 of the hole H12 of a second support component 54b are essentially the same. There is a ring 60 made of flexible material such as silicon and rubber is fitted to the rim of the second hole H12 of the second support component 54b. The inner diameter of the ring 60 is smaller than the outer diameter of the retaining member 16 whereby the ring 60 may hold the retaining member 16 that is inserted (press-fitted) into the ring.

Third Embodiment

Next, a fixture of a third embodiment of the present invention is described hereinafter. The configurational elements which are the same as those in the fixture of the first embodiment have the identical reference numerals and are omitted from the description.

It is possible to fix the retaining member in position using the magnetic force of a magnet attached to the rear end or the cuff member of the retaining member. It is also possible to make a locking mechanism at the cuff for fixing the retaining member in position. Furthermore, using a material such as plastic to increase the thickness of the support member and fix it with a wedge and the like may eliminate the cuff of the support member.

The present invention is not limited to the embodiments described above, and may be modified without changing the technological scope of the present invention. For example, all of the aforementioned embodiments or part of them combined may be considered within the scope of the present invention.

The fixture of the aforementioned embodiments may be also used to hang cookware in a kitchen. The retaining member of the fixture may be also used for holding documents by poking them. In other words, the fixture of the present invention includes storage cabinets for hanging cookware and office cabinets to hold documents.

In general, if a commercially available fixture utilizes the fixture of the present invention, it needs a display tool for displaying commercial goods' prices. The support member of the fixture of the aforementioned embodiments of the present invention may also be integrated with a display tool.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A fixture, comprising:
a fixture member;
a support member attached to the fixture member; and
a retaining member extending in a nearly horizontal direction to intersect with the direction along which the fixture member extends so that one end thereof is supported by the support member and positioned below the fixture member to hang and hold articles in position,
where the support member is composed of a first support member that extends vertically and supports the retaining member at a first position, a second support member that extends vertically and supports the retaining member at a second position, and a coupling component that connects the first support member and the second support member,
the coupling component is mounted on an upper surface of the fixture member,
a lower part of the support member has an opening capable of inserting the fixture member,
there are a first hole and a second hole formed in the first and the second support members for passing through the retaining member, respectively,
the first support member or the second support member, or the first support member and the second support member fix the retaining member,
the second support member has a positioning member that determines the position of the retaining member in a longitudinal direction,
a tip of the retaining member is tapered or chamfered,
the retaining member is detachably attached to the support member,
a weight applied to a tip side of the retaining member is supported by a lower rim of the first hole, and
at least one of the fixture member and the second support member is in contact with an upper surface of the retaining member to receive the weight applied to the tip side of the retaining member.

2. The fixture of claim 1, wherein
the tip of the retaining member prevents the articles from being dropped.

3. The fixture of claim 2, wherein
the retaining member is straight, and
a groove is formed along an entire circumference of the tip of the retaining member to prevent the articles from being dropped.

4. The fixture of claim 2, wherein
the positioning member is contacted with the retaining member to determine the position of the retaining member in the longitudinal direction.

5. The fixture of claim 2, wherein
a fixing means has a direction of extending a center axis of the first hole which is not aligned with a direction of extending a center axis of the second hole.

6. The fixture of claim 2, wherein
the retaining member is straight, and
the retaining member has a member having a diameter larger than that of the retaining member to prevent the articles from being dropped.

7. The fixture of claim 2, wherein
the positioning member is a cuff formed on the second support member.

8. A fixture, comprising:
a fixture member;
a support member attached to the fixture member; and
a retaining member extending in a nearly horizontal direction to intersect with the direction along which the fixture member extends so that one end thereof is supported by the support member and positioned below the fixture member to hang and hold articles in position,
where the support member is composed of a first support member that extends vertically and supports the retaining member at a first position, a second support member that extends vertically and supports the retaining member at a second position, and a coupling component that connects the first support member and the second support member,
the coupling component is mounted on an upper surface of the fixture member,
a lower end of the support member has an opening capable of inserting the fixture member,
there are a first hole and a second hole formed in the first and the second support members for passing through the retaining member, respectively,
the first support member or the second support member, or the first support member and the second support member fix the retaining member,
the second support member has a positioning member that determines the position of the retaining member in a longitudinal direction,
a tip of the retaining member is tapered or chamfered,
the retaining member is detachably attached to the support member, and
at least two of the first support member, the second support member, the coupling component and the retaining member are in contact with the fixture member.

9. The fixture of claim 8, wherein
the tip of the retaining member prevents the articles from being dropped.

10. The fixture of claim 9, wherein
the retaining member is straight, and
a groove is formed along an entire circumference of the tip of the retaining member to prevent the articles from being dropped.

11. The fixture of claim 9, wherein
the positioning member is contacted with the retaining member to determine the position of the retaining member in the longitudinal direction.

12. The fixture of claim 9, wherein
a fixing means has a direction of extending a center axis of the first hole which is not aligned with a direction of extending a center axis of the second hole.

13. The fixture of claim 9, wherein
the positioning member is a cuff formed on the second support member.

* * * * *